_United States Patent_ [19]

Vreeswijk et al.

[11] Patent Number: 4,704,629

[45] Date of Patent: Nov. 3, 1987

[54] TELEVISION SYSTEM AND DATA GENERATOR AND RECEIVER SUITABLE THEREFOR

[75] Inventors: Franciscus W. P. Vreeswijk; Sing L. Tan, both of Eindhoven, Netherlands

[73] Assignee: U.S. Philips Corporation, New York, N.Y.

[21] Appl. No.: 849,668

[22] Filed: Apr. 9, 1986

[30] Foreign Application Priority Data

Apr. 15, 1985 [NL] Netherlands .................. 8501096

[51] Int. Cl.⁴ .......................................... H04N 7/08
[52] U.S. Cl. .................. 358/142; 358/146; 358/14; 370/109
[58] Field of Search ............. 358/3, 142, 14, 15, 358/146; 370/109

[56] References Cited

U.S. PATENT DOCUMENTS

| | | | |
|---|---|---|---|
| 3,700,793 | 10/1972 | Borsuk et al. | 358/15 |
| 4,467,356 | 8/1984 | McCoy | 358/146 |
| 4,472,803 | 9/1984 | Iijima | 358/146 |
| 4,480,263 | 10/1984 | van Merode | 358/3 |
| 4,593,318 | 6/1986 | Eng et al. | 358/142 |
| 4,625,230 | 11/1986 | Tan et al. | 358/11 |

Primary Examiner—Howard W. Britton
Assistant Examiner—John K. Peng
Attorney, Agent, or Firm—Thomas A. Briody; William J. Streeter; Gregory P. Gadson

[57] ABSTRACT

Television transmission or data storage system with time-division multiplex encoding. At least two signal sources are coupled via an encoding circuit for time-division multiplex encoding to a transmission or storage channel to which a data receiver including a decoding circuit can be connected. The signal supplied comprises two or more sub-picture signals during the line periods and the signal-compression or expansion time ratios for the different sub-picture signals are different. The decoding circuit is suitable for consecutively supplying signals during a line period of the data receiver, which signals largely correspond to the different sub-picture signals.

11 Claims, 4 Drawing Figures

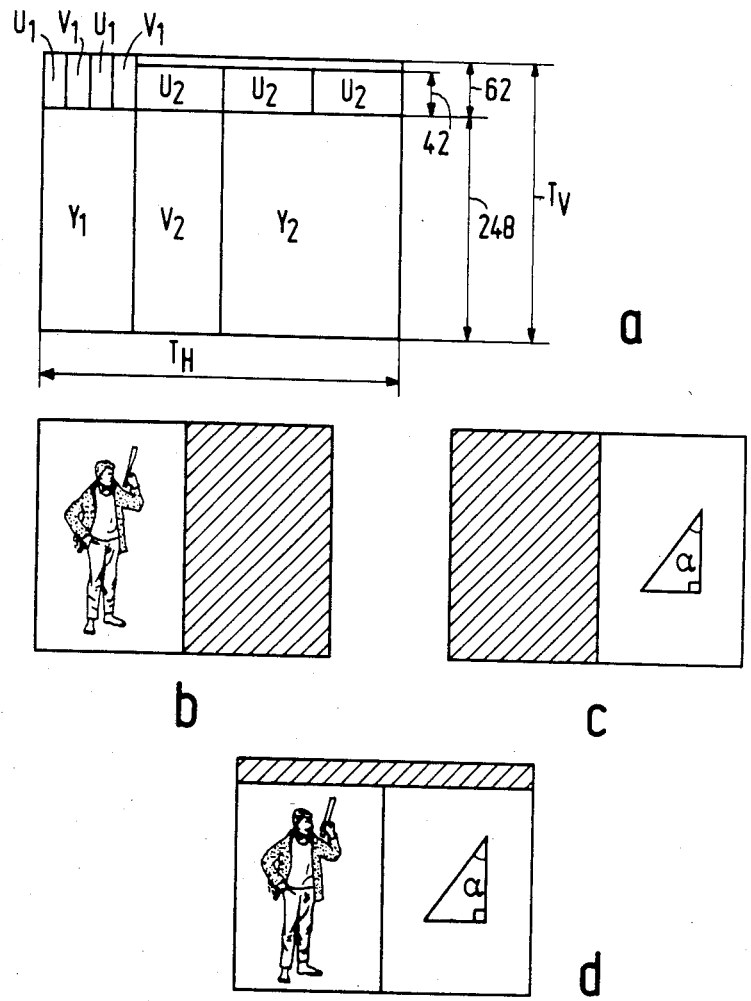
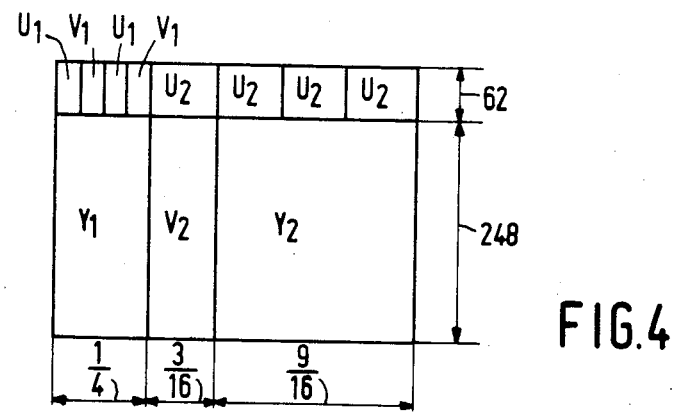
FIG.1
FIG.4

TELEVISION SYSTEM AND DATA GENERATOR AND RECEIVER SUITABLE THEREFOR

BACKGROUND OF THE INVENTION

The invention relates to a television transmission or data storage system comprising at least one data generator, at least one data receiver and a transmission or data storage channel arranged between the generator and the receiver, said data generator for supplying two essentially different picture signals being provided with a first signal source for supplying a signal comprising luminance information during a first part of a line period of the data generator, and with a second signal source for supplying a signal comprising luminance information during a second part of the line period of the data generator, the data generator being furthermore provided with an encoding circuit for a time-division multiplex encoding of the said signals comprising information and of signals comprising synchronizing and identification information, said encoding circuit having an output for supplying a time-division multiplex encoded signal for transmission via the transmission channel or storage in the data storage channel, the data receiver comprising a decoding circuit coupled to the said channel having a substantially adapted operation to that of said encoding circuit for supplying signals comprising luminance information which largely corresponds to the data produced by the signal sources in the data generator. The invention also relates to a data generator and receiver suitable for use with such a television system.

A system of this type is known for British Patent Application No. 2,140,242 (PHN 10,986) in the name of the Applicant. In this Application (see FIGS. 2d and 2e) a plurality of variants of a television system is described in which the luminance information of two different pictures is transmitted or stored. The two signals comprising the picture information are time-compressed by a time-compression factor which is equal to 0.5 for both of them. For each of these signals half of the signal transmission or storage capacity is thus used during half a line period. The picture information per period in the time-division multiplex encoded signal is sequentially composed of the time-compressed first and the time-compressed second luminance information. The relevant pictures may be used for the purpose of three-dimensional television in which one picture is intended for the left eye and the other picture is intended for the right eye. In this case both picture signals are supplied by the data receiver after time decompression or expansion. The transmitted or stored picture data utilizing the same transmission or data storage channel may also relate to entirely different pictures. Due to the time compression the two picture signals cannot be combined and supplied as such by the data receiver, that is to say, the receiver is to be able to select one or the other picture signal with the aid of a suitable indentification information. This transmission or storage system results in a loss of definition in view of the bandwidth limitation emanating from the compression and the decompression.

The invention is based on the recognition that the flexibility of the known television system can be even better utilized without too much loss of picture quality. To this end a television system according to the invention is characterized in that the encoding circuit is suitable for supplying at its output a time-division multiplex encoded signal having at least two sub-signals in which a first luminance information in the sub-signal supplied during the first part of a line period of the data generator corresponds to the luminance information of part of a line period of the first signal source and in which a second luminance information in the sub-signal supplied during the second part of the line period of the data generator corresponds to the luminance information of part of a line period of the second signal source, said signals being supplied after a change or no change in duration, the signal compression or expansion time ratio of the signal comprising the first luminance information differing from the corresponding ratio of the signal comprising the second luminance information, said ratio indicating the ratio between the durations of a luminance information before and after a change in duration, the decoding circuit being suitable for consecutively supplying during a line period of the data receiver a signal comprising luminance information which largely corresponds to the first luminance information, and a signal comprising luminance information which largely corresponds to the second luminance information.

Due to the measure according to the invention both sub-pictures with different time ratios for signal compression or expansion are transmitted or stored. Upon display the horizontal resolution of one sub-picture is therefore higher than the horizontal resolution of the other sub-picture. The more transmission or storage time is available for a sub-picture, the higher the horizontal resolution of this sub-picture and the lower the horizontal resolution of the other sub-picture. Thus it is obvious that a better quality of the first-mentioned sub-picture is at the expense of the quality of the second sub-picture. Consequently a choice has to be made between the two sub-pictures on the side of the data generator. For the sub-picture which is considered to be most important a high resolution may be given because little signal compression takes place whereas a lower resolution suffices for the other sub-picture because more signal compression is used. The above-defined time ratio is inverse to the above-mentioned time-compression factor. If this ratio is equal to 1:1, there is no signal compression and no signal expansion, whereas a ratio of more than 1:1 involves a signal compression and a ratio of less than 1:1 involves a signal decompression or expansion.

The television system according to the invention is also suitable for transmitting or storing colored images. A television system in which the signal from the first signal source and the signal from the second signal source also comprise chrominance information components, the encoding circuit being also suitable for a time-division multiplex encoding of the said signals with chrominance information and the decoding circuit being also suitable for supplying signals comprising chrominance information which largely corresponds to the data produced by the signal sources in the data generator is characterized in that in the time-division multiplex encoded signal applied to the output of the encoding circuit a first chrominance information during the said first part of a line period of the data generator corresponds to the chrominance information of the said part of a line period of the first signal source and that during the said second part of a line period of the data generator a second chrominance information corresponds to the chrominance information of the said part of a line period of the second signal source, the signal compression time ratio of the signal comprising the first chrominance information differing from the corresponding ratio of the signal comprising the second chrominance information, the decoding circuit being suitable for consecutively supplying during a line period of the data receiver a signal comprising chrominance information which largely corresponds to the first chrominance information, and a signal comprising chrominance information which largely corresponds to the second chrominance information.

A television system of this type is advantageously characterized in that the signal compression or expansion time ratio of the signal comprising the first luminace information is greater than the corresponding ratio of the signal comprising the second luminance information and that the signal compression time ratio of the signal comprising the first chrominance information associated with the signal comprising the first luminance information is greater than the corresponding ratio of the signal comprising the second chrominance information associated with the signal comprising the second luminance information.

A difference may also be made between the resolutions of the two sub-pictures in the vertical direction. A television system in which each chrominance information comprises two information components is characterized in that the first chrominance information is present during a number of line periods per field which is smaller than the number of line periods in which the first luminance information is present and that at least one information component of the second chrominance information is present during the number of line periods per field in which the second luminance information is present.

A data generator suitable for use in a television system according to the invention in which the encoding circuit includes a multiplex circuit for receiving the luminance information components from the signal sources and for generating the time-division multiplex encoded signal, said multiplex circuit comprising a switching stage controllable by means of a switching signal for selecting between the two signal sources, and a circuit for changing the duration for processing the luminance information is characterized in that the circuit for changing the duration is controllable by means of the switching signal for switching the signal compression or expansion time ratio between the first and the second part of a line period.

A data receiver suitable for use in a television system according to the invention, in co-operation with a data generator of the above-mentioned type, in which the decoding circuit includes a circuit for changing the duration for processing the received luminance information is characterized in that the circuit for changing the duration is controllable by means of a second switching signal for switching the signal compression or expansion time ratio between a first part of a line period of the data receiver in which the signal comprising luminance information which largely corresponds to the first luminance information is supplied and a second part in which the signal comprising luminance information which largely corresponds to the second luminance information is supplied.

BRIEF DESCRIPTION OF THE DRAWINGS

The invention will be described in greater detail by way of example with reference to the accompanying Figures in which FIG. 1 diagrammatically shows the structure of a television signal in the television system according to the invention, FIG. 4 is a modification of the television signal according to FIG. 1.

DETAILED DESCRIPTION OF THE INVENTION

Figure 2:
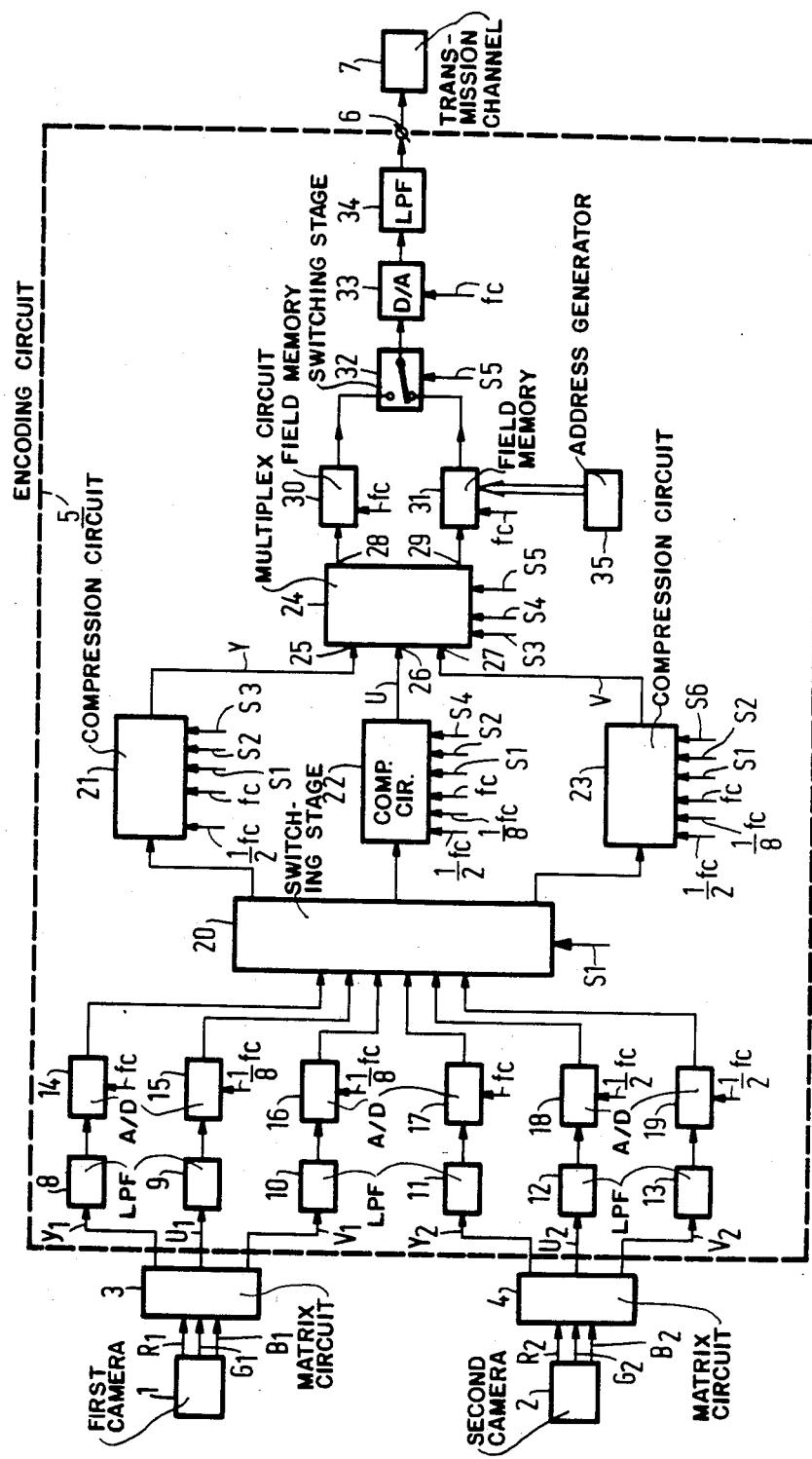
FIG. 2 is a block diagram of an embodiment of a data generator suitable for supplying a signal according to FIG. 1.

FIG. 1a diagrammatically shows the signal structure of a television signal. A field period $T_V$ is plotted vertically and a line period $T_H$ is plotted horizontally. For, for example, the European television standard a field period has a duration of 20 ms while the line period has a duration of 64 $\mu$s. For the sake of simplicity the line and field blanking periods are not shown in the Figures, that is to say, the periods at the beginning of each line or field in which no picture information is transmitted. The references $Y_1$ and $Y_2$ denote a signal region with luminance information in FIG. 1a, while chrominance information is denoted by the information components $U_1$, $U_2$, $V_1$ and $V_2$. In this case $U_1$ and $V_1$ and $U_2$ and $V_2$ are chrominance information components which are standardized in accordance with the PAL television standard. For the NTSC television standard in which $T_V$ has a duration of 16.7 ms, while $T_H$ has a duration of 63.5 $\mu$s, the references $U_1$ and $V_1$ and $U_2$ and $V_2$ are the chrominance information components I and Q standardized in accordance with this standard.

In the signal of FIG. 1a $I_1$, $U_1$ and $V_1$ are picture data associated with a first sub-picture, while $Y_2$, $U_2$ and $V_2$ are picture data associated with a second sub-picture. These picture data are encoded in a different manner for transmission and this in such a manner that a different transmission time is allotted to each sub-picture. FIG. 1b shows the first sub-picture and FIG. 1c shows the second sub-picture. A picture of a teacher and a blackboard may serve as an example. Recording is effected with the aid of two cameras one of which records the teacher and the other is directed to the blackboard. The part which is intended for transmission is taken from both camera signals. FIG. 1b shows that part of the signal from the first camera, for example, the first half is taken, whereas the rest is suppressed and FIG. 1c shows that part of the signal from the second camera is taken, for example, the second half, whereas the rest is suppressed. The picture to be displayed consists of the two parts obtained, with the transmission system being such that more transmission capacity is made available to the picture data $Y_2$, $U_2$ and $V_2$ relating to the blackboard than for the picture data $Y_1$, $U_1$ and $V_1$ relating to the teacher.

FIG. 1a shows that chrominace information is transmitted during a number of lines. These lines constitute a horizontal strip which is divided into a number of parts. The chrominance information component $U_1$ of the 63rd line of the field period of the first sub-picture is compressed to one sixteenth part of the active duration of the first line of the horizontal strip, which is approximately 3.3 $\mu$s. The duration of the line blanking period is assumed to be approximately 12 $\mu$s in this case. During the subsequent sixteenth part the information component $V_1$ of the 64th line of the field period of the first sub-picture is transmitted in a time-compressed form. The subsequent sixteenth part of the first line of the horizontal strip comprises the component $U_1$ of line 65 of the said field period, whereafter the component $V_1$ of line 66 up to the subsequent sixteenth part is compressed. When half the signal from the first camera is transmitted, that is to say, when half the active duration of the line periods of the picture of FIG. 1b is used, which is approximately 26 μs, and when the time ratio for signal compression is defined as the ratio between the durations of the information before and after a change in time, it is evident from the foregoing that the time ratio is 8:1 for both component $U_1$ and component $V_1$. During the rest of the first line of the horizontal strip no picture data are transmitted. Similarly, the second line of the horizontal strip consequtively comprises the component $U_1$ of line 67, the component $V_1$ of line 68, the component $U_1$ of line 69 and the component $V_1$ of line 70 of the field period of the first sub-picture, after which no picture data are transmitted. The subsequent lines of the horizontal strip comprise similar data.

Similarly, the twentieth line of the horizontal strip alternately comprises components $U_1$ and $V_1$ of the first sub-picture. Subsequently the chrominance information component $U_2$ of the 63rd line of the field period of the second sub-picture is transmitted in a timecompressed form during the subsequent fourth part of the said line, which is approximately 13 μs. When half the active duration of the line periods of the picture of FIG. 1c is used, it is found that the time ratio for signal compression is 2:1 for this component. The same applies to the subsequent fourth part of the line of the horizontal strip comprising the component $U_2$ of line 65 of the field period of the second sub-picture, as well as to the last fourth part comprising the component $U_2$ of line 67 of the said field period. The subsequent lines of the horizontal strip comprise data which are similar to those of the twentieth line. Finally, the 62nd line of the horizontal strip consequtively comprises the component $U_1$ of line 307, the component $V_1$ of line 308, the component $U_1$ of line 309 and the component $U_1$ line 310 of the field period of the first sub-picture, and the component $U_2$ of line 309 of the field period of the second sub-picture, after which no data are transmitted i.e. in the second half of the 62nd line.

During a number of 248 lines transmitted after the horizontal strip, the luminance information $Y_1$ of the relevant line of the first sub-picture, the chrominance information component $V_2$ and the luminance information $Y_2$ of the relevant line of the second sub-picture aree consecutively transmitted, information $Y_1$ is time-compressed to the first fourth part of the active line period, whereafter information $V_2$ is compressed to the subsequent fourth part. During the second half of the active line period information $Y_2$ is transmitted. Since the said three information components in FIGS. 1b and 1c are present during half the time, these processing steps imply that information components $Y_1$ and $V_2$ are time-compressed with a signal compression time ratio of 2:1, whereas information $Y_2$ is not compressed which corresponds to a signal compression time ratio of 1:1.

It is evident from the foregoing that the television signal of FIG. 1a comprises the picture data of the two sub-pictures: the luminance information $Y_1$ and the chrominance information components $U_1$ and $V_1$ of the first sub-picture are time-compressed, whereas the chrominance information components $U_2$ and $V_2$ of the second sub-picture are time-compressed and the luminance information $Y_2$ is not time-compressed. In addition the components $U_1$ and $V_1$ of the first sub-picture and the component $U_2$ of the second sub-picture are only transmitted every other line, whereas the luminance information components $Y_1$ and $Y_2$ of the two sub-pictures and the component $V_2$ of the second sub-picture are transmitted every line.

FIG. 2 shows a block diagram of a television data generator for supplying the signal of FIG. 1a in which the reference numeral 1 denotes the first camera and 2 denoted the second camera. Each camera supplies color information components R, G and B to matrix circuits 3 and 4, respectively, whose output signals are the luminance information components $Y_1$ and $Y_2$, and the chrominance information components $U_1$ and $V_1$, and $U_2$ and $V_2$, respectively. The relevant information components relate to the entire picture in accordance with FIGS. 1b and 1c, respectively, i.e. without suppression of a part thereof. The information components $Y_1$, $U_1$, $V_1$, $Y_2$, $U_2$ and $V_2$ are applied as input signals to an encoding circuit 5 an output 6 of which is connected as an output of the data generator to a transmission channel 7, for example, a satellite connection, a transmission channel on earth or a cable connection. Channel 7 may be a data storage channel with data storage and display apparatus. The specific construction of channel 7 is irrelevant to the invention.

Encoding circuit 5 includes six low-pass filters 8, 9, 10, 11, 12 and 13 to which the information components $Y_1$, $U_1$, $V_1$, $Y_2$, $U_2$ and $V_2$ respectively, are applied. The cut-off frequencies of filters 9, 10, 12 and 13 may be lower than the cut-off frequencies of filters 8 and 11 in this case. The bandwidth-limited output signals of the filters are applied to analog-to-digital converters 14, 15, 16, 17, 18 and 19 to which also clock pulses are applied, more specifically with a clock pulse frequency fc to converters 14 and 17 for converting the information components $Y_1$ and $Y_2$, with a clock pulse frequency ½ fc to converters 15 and 16 for converting the components $U_1$ and $V_1$ and with a clock pulse frequency ¼ fc to converters 18 and 19 for converting the components $U_2$ and $V_2$. In this case fc is equal to, for example, 20.25 MHz. These converters are succeeded by a multiplex circuit in the form of a switching stage 20 receiving a switching signal S1. Under the control of signal S1 either the digital information $Y_1$ of converter 14, or the digital information $Y_2$ of converter 17 is applied to a compression circuit 21. In the former case the digital information $U_1$ of converter 15 is applied to a compression circuit 22, while the digital information $V_1$ of converter 16 is applied to a compression circuit 23. In the latter case in which the digital information $Y_2$ is applied to circuit 21, the digital information $U_2$ of converter 18 is applied to circuit 22 under the control of signal S1, while the digital information $V_2$ of converter 19 is applied to circuit 23. Consequently a choice is made between the information components originating from cameras 1 and 2 by means of signal S1 which has the line frequency with an edge in the center of the active duration of a line period. During the first half of the said active duration the information components $Y_1$, $U_1$ and $V_1$ are transmitted and during the second half the information components $Y_2$, $U_2$ and $V_2$ are transmitted.

Compression circuits 21, 22 and 23 have a known construction. They comprise line memories i.e. digital memories whose storage capacity is sufficient to store the information of a television line and which are of the type having different write and read rates. Circuits 21, 22 and 23 receive clock pulse signals and switching signals. Clock pulse signals with the clock pulse frequencies $\frac{1}{2}$ fc and fc are applied to circuit 21, as well as a symmetrical square-wave signal S2 of half the line frequency and two line frequency square-wave switching signals, namely signal S1 and a signal S3 which has a pulse level during the first fourth part and during the second half of the active duration of a line period and has a different pulse level during the second fourth part of the said duration. Clock pulse signals with the clock pulse frequencies fc, $\frac{1}{2}$ fc and $\frac{1}{8}$ fc are applied to circuit 22, as well as signal S2 and two line-frequency switching signals, namely signal S1 and a signal S4 which has a pulse level during the first and the third sixteenth part and during the last three fourth parts of the active duration of a line period and a different pulse level during the rest of the period. Similarly, clock pulse signals with the clock pulse frequencies fc, $\frac{1}{2}$ fc and $\frac{1}{8}$ fc are applied to circuit 23, as well as signal S2 and two line-frequency switching signals, namely signal S1 and a signal S6 which has a pulse level during the second, the fourth sixteenth part and the second fourth part of the active duration of a line period and a different pulse level during the rest of the period.

The digital information Y is written in a line memory with the aid of the compression circuit 21 for Y with the clock pulse frequency $\frac{1}{2}$ fc during the first half of the active duration of a line period, and this information is written with the frequency fc during the second half. During the first fourth part and during the second half of the active duration of the subsequent line period the memory is read at the frequency fc. The same processing steps are effected with a delay of one line period in another line memory. Similarly, the digital information U is written in a line memory with the aid of the compression circuit 22 for U with the clock pulse frequency $\frac{1}{8}$ fc during the first half of the said duration and this information is written at the frequency $\frac{1}{2}$ fc during the second half. During the first or the third sixteenth part of the active duration of the subsequent line period and during the last three fourth parts of the active duration of the subsequent line the memory is read with the frequency fc. The same processing steps are effected with a delay of one line period in another line memory. The digital information V is written in a line memory with the aid of the compression circuit 23 for V with the clock pulse frequency $\frac{1}{8}$ fc during the first half of the active duration of a line period and this information is written with the frequency $\frac{1}{2}$ fc during the second half. During the second or the fourth sixteenth part of the active duration of the subsequent line period and during the second fourth part of the active duration of the subsequent line the memory is read with the frequency fc. The same processing steps are performed with a delay of one line period in another line memory. The obtained output signals from circuits 21, 22 and 23 are applied to three inputs 25, 26 and 27 of a multiplex circuit 24 which applies these signals to two outputs 28 and 29 under the control of switching signals S3, S4 and S5. Signal S5 has the field frequency with an edge after the 62nd line period. During the first fourth part and during the second half of the active duration of lines 63 to 310 inclusive input 25 and output 28 are interconnected and during the second fourth part of the said duration input 27 is connected to output 28. During the first or the third sixteenth part of the active duration of lines 63 to 310 inclusive and during the second, the third or the last fourth part of the active duration of the same lines, input 26 and output 29 are interconnected and during the second or the fourth sixteenth part of the active duration of the same lines input 27 is connected to output 29. During the first 62 lines output 28 and output 29 are not connected. The signal obtained at output 28 is applied to a memory 30 for the Y signal and the signal obtained at output 29 is applied to a memory 31 for the chrominance signal.

Memories 30 and 31 are field memories, which are digital memories whose storage capacity is sufficient to store the information of a television field. As a result a delay of one field period may be caused. Both memories receive the clock pulse signal at the clock pulse frequency fc. During a field period the digital information is written at the input of each memory and during the sebsequent field period the memory is read. This applies to a non-interlaced system. In an interlaced system the delay that occurs must be substantially equal to one field period and to an integral number of line periods, in this example 62+248=310 lines. Memory 31 is controlled by an address generator 35 ensuring that the different parts of the chrominance signal of FIG. 1a are arranged in the correct position. The outputs of memories 30 and 31 are each connected to a selection contact of a switching stage 32 the master contact of which is connected under the control of switching signal S5 either to the output of memory 31, more specifically during the first 62 lines of each field, or to the output of memory 30, more specifically during lines 63 to 310 inclusive. This shows that the information from cameras 1 and 2 relating to the first 62 lines of the field is suppressed. The master contact of stage 32 is connected to a digital-to-analog converter 33 to which a clock pulse signal with the clock pulse frequency fc is applied and whose output signal is present via a low-pass filter 34 at the output 6 of encoder circuit 5. It is assumed in this case that channel 7 is suitable for analog signal processing. The signal at output 6 is the signal of FIG. 1a.

Figure 3:
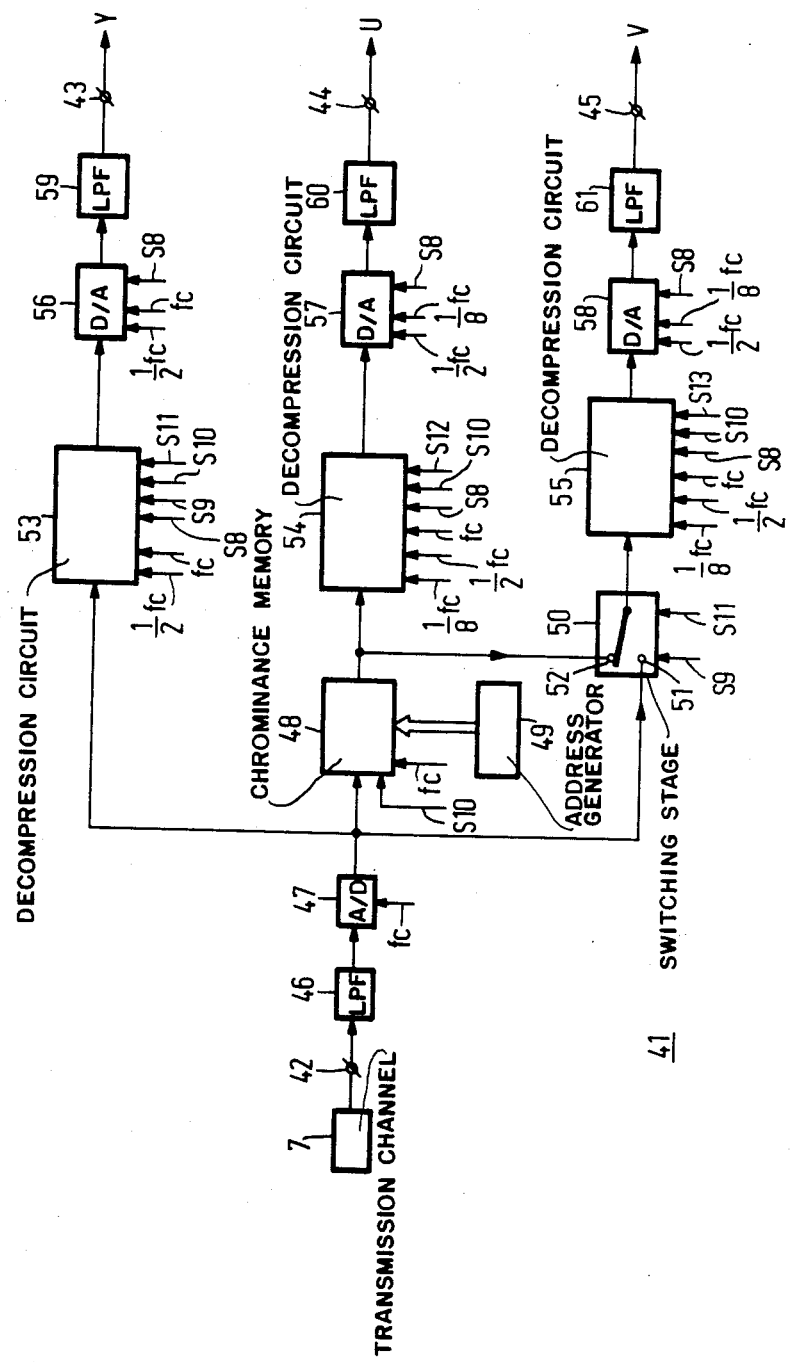
FIG. 3 is a block diagram of an embodiment of a data receiver suitable for receiving a signal according to FIG. 1

FIG. 3 shows an embodiment of a data receiver receiving the signal of channel 7 at an input 42 of a decoding circuit 41. For its operation it is essentially complementary to the encoding circuit 5 of FIG. 2, i.e. a luminance information Y and chrominance information components U and V occur at outputs 43, 44 and 45, respectively, of decoder circuit 41, which components correspond as much as possible with the parts of information components Y, U and V processed in encoding circuit 5.

In decoding circuit 41 input 42 is connected to the input of a low-pass filter 46. The output of filter 46 is connected through an analog-to-digital converter 47, to which a clock pulse signal is applied with the frequency fc, to a chrominance memory 48 controlled by an address generator 49, to a first selection contact 51 of a switching stage 50 and to a first decompression circuit 53. An output of memory 48 is connected to a second selection contact 52 of stage 50 and to a second decompression circuit 54. The master contact of stage 50 is connected to a third decompression circuit 55. Decompression circuits 53, 54 and 55 are designed in known manner. They comprise line memories which are of the type having different write and read rates and they receive clock pulse signals and switching signals.

Clock pulse signals with the clock pulse frequencies $\frac{1}{2}$ fc and fc are applied to circuit 53, as well as a line-frequency square-wave switching signal S8 which has an edge in the center of the active duration of a line period, a line frequency switching signal S9 having a pulse level during the second fourth part of the active duration of a line period and having a different pulse level during the rest of the period, a symmetrical square-wave signal S10 of half the line frequency and a field-frequency switching signal S11 having an edge after the 62nd line of each field. The incoming digital information at the clock pulse frequency fc is entered into a line memory with the aid of the decompression circuit S3 for Y during the first fourth part and during the second half of the active duration of lines 63 to 310 inclusive. During the first half of the active duration of the subsequent line period the memory is read at the frequency ½ fc and during the second half it is read at the frequency fc. The same processing steps are performed in another line memory with a delay of one line period. Under these circumstances a signal is present at the output of circuit 53, which signal is time-decompressed or expanded with a time ratio for signal expansion of 1:2 during the said first half and which has undergone no decompression during the said second half, which is a time ratio of 1:1. During the first 62 lines of the field circuit 53 does not have an output signal. It is evident from the foregoing that the output signal of circuit 53 which is present corresponds to the luminance information $Y_1$ of the first sub-picture during the first half of the line and to the luminance information $Y_2$ of the second sub-picture during the second half. The output of circuit 53 is connected to the output 43 of decoding circuit 41 via a digital-to-analog converter 56 and a low-pass filter 59. Converter 56 receives switching signal S8 with which switching between the clock pulse signals with the frequencies ½ fc and fc is effected, the first-mentioned being applied during the first half of each line and the second being applied during the second half of each line.

Memory 48 receives switching signal S10 and the clock pulse signal with the frequency fc for writing during the first 62 lines of each field. Memory 48 is read at the same clock pulse frequency with the aid of address generator 49, and this in such a manner that the correct chrominance information is passed on so that the output signal of memory 48 does not contain any information during the first 62 line periods, after which it contains the following information components for each line: the component $U_1$ of the same line during the first sixteenth part of the active duration of the line, the component $V_1$ of the subsequent line during the second sixteenth part and the component $U_2$ of the same line during the second fourth part. The compression of the said components has not been changed. Clock pulse signals with the clock pulse frequencies ⅛ fc, ½ fc and fc are also applied to circuit 54 which receives this output signal, as well as switching signals S8 and S10 and a line-frequency switching signal S12 having a pulse level during the first sixteenth part and during the second fourth part of the active duration of a line period and having a different pulse level during the rest of the period. A line memory is written at the clock pulse frequency fc with the aid of the decompression circuit 54 for U during the said intervals and the memory is read at the frequency ⅛ fc during the first half of the active duration of the subsequent line period and at the frequency of ½ fc during the second half. The same processing steps are performed with a delay of one line period in another line memory. Under these circumstances a signal is present at the output of circuit 54, which signal is time-decompressed during the said first half with a time ratio for signal expansion of 1:8 and which is time-decompressed during the said second half with a time ratio for signal expansion of 1:2. In the first case this signal corresponds to the chrominance information component $U_1$ of the first sub-picture and in the second case it corresponds to the chrominance information component $U_2$ of the second sub-picture. The output of circuit 54 is connected to the output 44 of decoding circuit 41 via a digital-to-analog converter 57 which receives a clock pulse signal which is switched with the aid of signal S8 between the frequencies ⅛ fc and ½ fc and a low-pass filter 60.

Switching stage 50 is controlled by switching signals S9 and S11. During the second fourth part of the active duration of lines 63 to 310 inclusive the master contact is connected to contact 51 so that the digital information component $V_2$ is passed on to circuit 55. During the rest of the period of the said lines the master contact of stage 50 is connected to contact 52 so that the digital information components $U_1$, $V_1$ and $U_2$ originating from memory 48 are passed on to circuit 55. Clock pulse signals with the clock pulse frequencies ⅛ fc, ½ fc and fc are also applied to circuit 55, as well as switching signals S8 and S10 and a line-frequency switching signal S13 having a pulse level during the second sixteenth part and during the second fourth part of the active duration of a line period and having a different pulse level during the rest of the period. With the aid of the decompression circuit 55 for V writing is effected in a line memory at the clock pulse frequency fc during the said intervals. During the first half of the active duration of the subsequent line period the memory is read at the frequency ⅛ fc and during the second half it is read at the frequency ½ fc. The same processing steps are performed in another line memory with a delay of one line period. Under these circumstances a signal is present at the output of circuit 55, which signal is time-decompressed during the said first half with a time ratio for signal expansion of 1:8 and which is time-decompressed during the said second half with a time ratio for signal expansion of 1:2. In the first case this signal corresponds to the chrominance information component $V_1$ of the first sub-picture and in the second case it corresponds to the chrominance information component $V_2$ of the second sub-picture. The output of circuit 55 is connected to the output 45 of decoding circuit 41 via a digital-to-analog converter 58 which receives a clock pulse signal which is switched with the aid of signal S8 between the frequencies ⅛ fc and ½ fc and a low-pass filter 61.

It will be noted that the circuits described with reference to FIGS. 2 and 3 may include other parts which are not important to the invention and which have therefore been omitted for the sake of simplicity. Delay elements for compensating delays caused by different elements, specifically filters are such parts. A refinement can be introduced in known manner in the decoding circuit according to FIG. 3, which consists in that the information component $U_1$ and/or $U_2$ in the data receiver is repeated after one line period for display instead of the non-transmitted corresponding information of the subsequent line. As a rule the repeated information deviates only very little from the non-transmitted information so that an improvement of the vertical resolution is obtained. A further improvement is obtained in that the information which replaces the non-transmitted information is not the information of the previous line, but is the result of the interpolation between this information and the information of the subsequent line, for example, for the component $U_1$ of line 64 it is half the sum of the component $U_1$ of lines 63 and 65.

FIG. 1d shows the picture produced upon display with the aid of the data receiver of FIG. 3. The picture consists of two sub-pictures with each sub-picture covering half the width of the total picture in this example. The sub-picture with the information components $Y_1$, $U_1$ and $V_1$ is displayed on the left, which is the teacher in the example, and the sub-picture with the information components $Y_2$, $U_2$ and $V_2$ is displayed on the right, which is the blackboard in this example. A number of lines without picture data is present at the top of the picture. If desired these lines may be displayed in black because the data receiver includes a circuit for suppressing the display during these line periods. It is evident from the foregoing that the sub-pictures are not transmitted and displayed in the same manner. Signal compression time ratios of 2:1 for the luminance information $Y_1$ and of 8:1 for the two chrominance information components $U_1$ and $V_1$ apply to the first sub-picture in FIG. 2. If the bandwidth of the transmission channel, for example, a satellite channel is 8.4 MHz, the described transmission results in a reduction of the bandwidth by a factor of 2 for the luminance information and by a factor of 8 for the two chrominance information components, i.e. 4.2 MHz and 1.05 MHz, respectively. The corresponding figures are 2.5 and 0.625 MHz for a cable system having a bandwidth of, for example, 5 MHz. Signal compression time ratios of 1:1 for the luminance information $Y_2$ and of 2:1 for the two chrominance information components $U_2$ and $V_2$ apply to the second sub-picture of FIG. 2. In the said satellite channel transmission a bandwidth of 8.4 MHz is obtained for $Y_2$ and of 4.2 MHz for $U_2$ and $V_2$ and in the said cable system the bandwidth is 5 MHz for $Y_2$ and 2.5 MHz for $U_2$ and $V_2$. These figures show that the second sub-picture is displayed with a higher resolution, both for luminance and for chrominance than the first sub-picture, the chrominance resolution being lower than the luminance resolution for both sub-pictures. A selection as to which sub-picture will be displayed with more resolution can be made in the data generator.

The considerations concerning resolution relate to the horizontal resolution. In the example described the vertical resolution for the luminance information components $Y_1$ and $Y_2$ of the two sub-pictures is the same. For the chrominance information components $U_1$ and $V_1$ of the first sub-picture a reduction by a factor of 2 is effected, while the same reduction is effected for only the component $U_2$ of the second sub-picture and not for the component $V_2$. The structure of the signal of FIG. 1a may have many variants while maintaining the measure according to the invention. For example, the lines whose picture data are not displayed may be divided into a part at the beginning and a part at the end of the field so that a dark horizontal strip is visible upon display both at the top and at the bottom of the picture, with the height of each strip being half the height of the horizontal strip in FIG. 1d. The chrominance information components transmitted during the said lines may also occur in a different sequence. It will be noted that the television system described can also be used as a monochrome television system for at least one sub-picture, for example, for displaying text and/or graphic characters with no chrominance information being transmitted. If no sub-picture which is to be displayed comprises chrominance information, the picture data of all lines of the field are transmitted and displayed. In addition the transmission time for information $Y_2$ may be extended in this case relative to FIG. 1a. This implies that the useful duration of the picture in the horizontal direction in FIG. 1c is longer than the corresponding duration in FIG. 1b and/or that the part of period $T_H$ in FIG. 1a in which $Y_2$ is transmitted is longer than the part in which $Y_1$ is transmitted. In this case, which is for that matter also possible in a television system in which chrominance information is also transmitted and displayed, a time expansion for information $Y_2$ may take place. As a result a still wider band and consequently a still better horizontal resolution is obtained for this information than has been described in the foregoing. A compression for this information is then to be effected in the data receiver. It will also be noted that the part in FIGS. 1b and c intended for transmission may be arbitrarily located relative to the entire picture, for example, in its center. It is also possible to transmit and display more than two, for example, three sub-pictures which can be encoded in different manners for transmission and to which sub-pictures different transmission times can be allotted so that the picture displayed reveals differences in horizontal resolution between the sub-pictures. The limits between the different signal regions allotted to the information components $Y_1$, $U_1$, $V_1$, $Y_2$, $U_2$, $V_2$... in FIG. 1a or in similar figures can be varied in known manner so that the different time ratios for signal compression or expansion may be variable.

FIG. 4 shows a variant of the signal according to FIG. 1a in which the lines of the horizontal strip formed by the first 62 lines at the top are entirely utilized for transmitting information. In FIG. 4 fractions denote parts of the active duration of the line periods. Nothing has changed with respect to FIG. 1a for the information components $Y_1$, $U_1$ and $V_1$ of the first sub-picture, which implies signal compression time ratios of 2:1, 8:1 and 8:1, respectively. The time after the first fourth part of the said active duration is not divided by three but by four, which results in the fraction 3/16. This shows that both the components $U_2$ and the component $V_2$ of the chrominance information of the second sub-picture undergo a time compression with a signal compression time ratio of $\frac{1}{2}:3/16=2.67:1$, i.e. more than was the case in FIG. 1a. On the other hand the luminance information $Y_2$ of the second sub-picture is transmitted during 9/16 of the active duration of lines 63 to 310 inclusive. If half the time of the camera is still used for this sub-picture, as was the case in FIG. 1d, this implies a time expansion with a signal expansion time ratio of $\frac{1}{2}:9/16=1:1.13$. As compared with the system of FIG. 1, this system thus yields an improvement of the horizontal resolution for $Y_2$. With reference to the foregoing description it will be evident to those skilled in the art in which manner the data generator of FIG. 2 and the data receiver of FIG. 3 must be modified for the signal of FIG. 4 or of a variant thereof which is not shown. In such a variant the components of the first 62 lines may be positioned, for example, in such a manner that a component $U_2$ occurs during 3/16 of the said duration every time after a component $U_1$ during one sixteenth part of the active duration of a line period. Particularly circuit 21 performs a time expansion for the system of FIG. 4 during the time when information $Y_2$ is processed, while circuit 53 performs a time compression.

What is claimed is:
1. A television system for television transmission in data storage comprising at least one data generator, at least one data receiver and a transmission or data stor- age channel arranged between the generator and the receiver, said data generator for supplying two essentially different picture signals being provided with a first signal source for supplying a signal comprising luminance information during a first part of a line period of the data generator, and with a second signal source for supplying a signal comprising luminance information during a second part of the line period of the data generator, the data generator being furthermore provided with an encoding circuit for a time-division multiplex encoding of the said signals comprising luminance information and of signals comprising synchronizing and identification information, said encoding circuit having an output for supplying a time-division multiplex encoded signal for transmission via the transmission channel or storage in the data storage channel, this time-division multiplex encoded signal having at least two sub-signals in which a first luminance information in the sub-signal supplied during the first part of a line period of the data generator corresponds to the luminance information of part of a line period of the first signal source and in which a second luminance information in the sub-signal supplied during the second part of the line period of the data generator corresponds to the luminance information of part of a line period of the second signal source, the data receiver comprising a decoding circuit coupled to the said channel having a substantially adapted operation to that of said encoding circuit for supplying signals comprising luminance information which substantially corresponds to the data produced by the signal sources in the data generator, these signals being such, that a signal comprising luminance information which substantially corresponds to the first luminance information, and a signal comprising luminance information which substantially corresponds to the second luminance information is consecutively supplied during a line period of the data receiver, said system being characterized in that the signals supplied by the encoding circuit are supplied after a predetermined change in duration or unchanged in duration, the signal comprising the first luminance information having a signal compression or expansion time ratio differing from the corresponding ratio of the signal comprising the second luminance information, said ratio indicating the ratio between the durations of a luminance information before and after the predetermined change in duration and is equal to unity when the durations of a luminance information are unchanged.

2. A data generator suitable for use in a television system as claimed in claim 1 in which the encoding circuit includes a multiplex circuit for receiving the luminance information components from the signal sources and for generating the time-division multiplex encoded signal, said multiplex circuit comprising a switching stage controllable by means of a switching signal for selecting between the two signal sources, and a circuit for changing the duration for processing the luminance information, characterized in that the circuit for changing the duration is controllable by means of the switching signal for switching the signal compression or expansion time ratio between the first and the second part of a line period.

3. A data receiver suitable for use cooperation with a data generator as claimed in claim 2, in which the decoding circuit includes a circuit for changing the duration for processing the received luminance information, characterized in that the circuit for changing the duration is controllable by means of a second switching signal for switching the signal compression of expansion time ratio between a first part of a line period of the data receiver in which the signal comprising luminance information which substantially corresponds to the first luminance information is supplied and a second part in which the signal comprising luminance information which largely corresponds to the second luminance information is supplied.

4. A data receiver as claimed in claim 3 in which the decoding circuit furthermore includes a first and a second digital-to-analog converter for converting the digital signals obtained after the change in duration, characterized in that the first and the second digital-to-analog converter is controllable by means of the second switching signal for switching the clock pulse frequency.

5. A television system as claimed in claim 1, in which the signal from the first signal source and the signal from the second signal source also comprise chrominance information components, the encoding circuit being also suitable for a time-division multiplex encoding of the said signals with chrominance information being such that in the time-division multiplex encoded signal supplied to the output of the encoding circuit a first chrominance information during the said first part of a line period of the data generator corresponds to the chrominance information of the said part of a line period of the first signal source and that during the said second part of a line period of the data generator a second chrominance information corresponds to the chrominance information of the said part of a line period of the second signal source, and the decoding circuit being also suitable for supplying signals comprising chrominance information which substantially corresponds to the data produced by the signal sources in the data generator, these signals being such, that a signal comprising chrominance information which substantially corresponds to the first chrominance information, and a signal comprising chrominance information which largely corresponds to the second chrominance information is consecutively supplied during a line period of the data receiver, characterized in that the signal comprising the first chrominance information has a signal compression time ratio which is different from the corresponding ratio of the signal comprising the second chrominance information.

6. A data generator suitable for use in a television system as claimed in claim 5, in which the encoding circuit includes a multiplex circuit for receiving the luminance information components from the signal sources and for generating the time-division multiplex encoded signal, said multiplex circuit comprising a switching stage controllable by means of a switching signal for selecting between the two signal sources, a first circuit for changing the duration for processing the luminance information, and a second circuit for changing the duration for processing the chrominance information, characterized in that the first and second circuits for changing the corresponding durations are controllable by means of the switching signal for switching the signal compression time ratio between the first and second part of a line period.

7. A data receiver suitable for use in cooperation with a data generator as claimed in claim 6, in which the decoding circuit includes a first circuit for changing the duration for processing the received luminance information, and a second circuit for changing the duration for processing the received chrominance information, characterized in that the first and second circuits for changing the corresponding durations are controllable by means of a second switching signal for switching the signal compression or expansion time ratio between a first part of a line period of the data receiver in which the signals comprising luminance and chrominance information which substantially correspond to the first luminance and chrominance information are supplied and a second part in which the signals comprising luminance and chrominance information which substantially correspond to the second luminance and chrominance information are supplied.

8. A data receiver as claimed in claim 7 in which the decoding circuit furthermore includes a first and a second digital-to-analog converter for converting the digital signals obtained after the change in duration, characterized in that the first and the second digital-to-analog converter is controllable by means of the second switching signal for switching the clock pulse frequency.

9. A television system as claimed in claim 5, characterized in that the signal compression or expansion time ratio of the signal comprising the first luminance information is greater than the corresponding ratio of the signal comprising the second luminance information and that the signal compression time ratio of the signal comprising the first chrominance information associated with the signal comprising the first luminance information is greater than the corresponding ratio of the signal comprising the second chrominance information associated with the signal comprising the second luminance information.

10. A television system as claimed in claim 9 which each chrominance information comprises two information components, the first chrominance information being present during a number of line periods per field which is smaller than the number of line periods in which the first luminance information is present characterized in that at least one information component of the second chrominance information is present during the number of line periods per field in which the second luminance information is present.

11. A television system as claimed in claim 9 which each chrominance information comprises two information components, characterized in that the signal compression time ratio of the signal comprising the first chrominance information is the same as for the two information components and that the signal compression time ratio of the signals comprising the second chrominance information is the same as for the two information components.

* * * * *

UNITED STATES PATENT AND TRADEMARK OFFICE
CERTIFICATE OF CORRECTION

PATENT NO. : 4,704,629

DATED : November 3, 1987

INVENTOR(S) : Franciscus W. P. Vreeswijk, et al

It is certified that error appears in the above-identified patent and that said Letters Patent is hereby corrected as shown below:

IN THE CLAIMS

| | |
|---|---|
| Claim 3, line 1 | after use insert --in-- |
| line 7 | delete "of" insert --or-- |
| line 13 | delete "largely" insert --substantially-- |

Signed and Sealed this

Sixth Day of December, 1988

Attest:

DONALD J. QUIGG

Attesting Officer

Commissioner of Patents and Trademarks